United States Patent [19]

Curtis, Jr. et al.

[11] Patent Number: 5,867,275

[45] Date of Patent: Feb. 2, 1999

[54] METHOD AND APPARATUS FOR HIGH SPEED MEASUREMENT OF OILFIELD TUBULAR DIAMETER AND OVALITY

[75] Inventors: William W. Curtis, Jr.; Roy C. Grubbs, both of Houston; Kevin D. Logan, Humble; John A. Miller, Houston, all of Tex.

[73] Assignee: ICO, Inc., Houston, Tex.

[21] Appl. No.: 851,584

[22] Filed: May 5, 1997

[51] Int. Cl.⁶ .......................... G01B 11/08; G01B 11/10
[52] U.S. Cl. .......................................... 356/384; 356/385
[58] Field of Search ...................................... 356/384–387

[56] References Cited

U.S. PATENT DOCUMENTS

| | | | |
|---|---|---|---|
| 4,533,251 | 8/1985 | French et al. | 356/384 |
| 5,291,272 | 3/1994 | Demirsu | 356/384 |

OTHER PUBLICATIONS

The Target System Series 4000; no page numbers available, no date available.

Digital Readout System, Linear Scale, Series 539, by Mitutoyo; page numbers not available, no date available.

Typical Roh'lix Actuator Applications, by Zero–Max; page number not available, date not available.

*Primary Examiner*—Frank G. Font
*Assistant Examiner*—Amanda Merlino
*Attorney, Agent, or Firm*—Browning Bushman

[57] ABSTRACT

A test apparatus 10 for testing the diameter of oilfield tubulars having various nominal diameters includes a machine frame 12 for successively receiving the axially movable tubulars, and upper and lower radially opposing carriages 16 and 18 each movable relative to the machine frame. First and second light generating sources 24 and 26 are each mounted on a respective carriage and transmit a wide light beam directed to intersect radially opposing sides in the oilfield tubular, such that the width of each light beams is reduced by engagement with the tubular. First and second light detectors 28 and 30 are each mounted on the carriages and are positioned for detecting the position of the reduced width light beams relative to the carriages and generating test signals in response thereto. Computer 32 is provided for receiving test signals from the sensors and generating a tubular diameter test measurement in response thereto. The test apparatus includes upper and lower optical shutters 52 and 54 each mounted on the carriages and movable from an active standardization check position to an inactive position. Each shutter has an opening therein for transmitting a preselected reduced width light beam past the shutter. Micrometer 56 is provided for measuring a radial spacing between the first and second carriages and generating a carriage spacing signal in response thereto. According to the method of the invention, a specific test specimen 42, 44 is positioned for calibrating the spacing between the carriages. The carriages are then moved to a standardization position and shutters are used to perform a standardization check on the equipment. Assuming this standardization check is passed, the shutters are moved to an inactive position and tubulars then tested for diameter and ovality. Significant savings are realized by not having to recalibrate the test apparatus for each size nominal diameter tubular being tested, and by not requiring a test standard for each size tubular capable of being tested.

22 Claims, 4 Drawing Sheets

METHOD AND APPARATUS FOR HIGH SPEED MEASUREMENT OF OILFIELD TUBULAR DIAMETER AND OVALITY

FIELD OF THE INVENTION

The present invention relates to equipment and techniques for measuring the diameter and ovality of tubulars. More specifically, this invention relates to techniques for detecting irregularities in either the diameter or the ovality of oilfield tubulars while the tubulars are being inspected for material defects by high speed non-destructive testing equipment.

BACKGROUND OF THE INVENTION

Non-destructive testing equipment has been used for decades to detect material defects in oilfield tubulars. Advancements in ultrasonic and electromagnetic testing techniques have resulted in equipment which is able to reliably detect material defects at rates in the range of from 40 to 400 thirty-foot joints of pipe per hour. Such high speed testing equipment has reduced the cost of non-destructive testing and, equally important, has reduced the lead time between a pipe order to an inspection yard and the delivery of inspected oilfield tubulars to the well site.

Equipment has been used for detecting irregularities in the outside diameter and ovality of oilfield tubulars ever since these tubulars were used in oilfield operations. In spite of technological advances, many oilfield tubulars are still manually checked with O.D. calipers. While these manual checking operations may be satisfactory when the customer requests that only random checks be made on a lot of oilfield tubulars, this technique becomes too expensive and time consuming when numerous axial locations along the length of each tubular are to be checked for outer diameter and ovality conformance. Increased emphasis is being placed on oilfield tubular diameter and ovality tolerance, particularly for deep offshore wells where tubulars are exposed to corrosive environments. Accordingly, manual checking of oilfield tubular diameter and ovality is practically not an option for these oilfield tubulars.

One technique for more rapidly testing oilfield tubular diameter utilizes a pair of light beams each directed traverse to the axis of the tubular. A pair of relatively wide light beams strike radially opposing sides of the tubular, such that the tubular material blocks light to alter the width of each beam. The spacing between the reduced width beams is accordingly a measure of the diameter of the oilfield tubular. Optical systems thus offer significant advantages in being able to test oilfield tubular diameters at a rate commensurate with medium speed non-destructive equipment systems used for testing oilfield tubulars.

Significant problems remain, however, before oilfield tubular diameter and ovality can be rapidly checked at higher speeds desired by both inspection service companies and their customers. One problem with existing optical testing systems is the time required to process the data from detectors which sense the presence of light and thus generates raw data indicative of the spacing between the reduced width light beams. Significant delays are commonly experienced between diameter and ovality tests on oilfield tubulars utilizing existing optical technology and the generation of meaningful data which indicates to the testing operator the information necessary to pass or fail the tubular. Also, those skilled in the art recognize that orders to inspection yards are typically performed on a first-in/first-out basis, that successive orders are rarely for the same pipe size, and that a single inspection order may require the testing of different oilfield tubular sizes. Filling an inspection order thus commonly requires one or more recalibrations of the testing equipment. A test standard corresponding to the specific size tubular to be tested is thus positioned within the testing equipment, and the equipment is then calibrated or "zeroed" to that test standard. The optical testing equipment thus measures positive or negative variations from the test standard when performing the O.D. test on a specific size oilfield tubular. The printout to the inspection operator thus indicates the positive or negative variation of the tubular diameter compared to the test standard.

The above technique has several major drawbacks. A significant amount of time is required to recalibrate the equipment each time a different size oilfield tubular is to be tested. Since it is preferable to test oilfield tubular diameter and ovality at the same time each tubular is being checked for material defects with non-destructive testing equipment, the time required to recalibrate the optical equipment for checking a tubular diameter slows down the overall inspection process. Also, each inspection yard must maintain a complete set of different oilfield tubular diameter test standards to be used to calibrate the optical inspection equipment. These tubular diameter test standards must be carefully maintained, since any variation of the test standard will lead to incorrect diameter variation measurements.

The disadvantages of the prior art are overcome by the present invention, and improved methods and apparatus are hereinafter disclosed for the high speed measurement of oilfield tubular diameter and ovality. The present invention significantly reduces the time required to standardize equipment between different tubular diameter runs, and allows oilfield tubular diameter and ovality measurements to be conducted and the data output in real time at tubular feed through rates commensurate with high speed non-destructive testing equipment.

SUMMARY OF THE INVENTION

Oilfield tubular diameter and ovality may be obtained at a high feed through tubular speed, and the test data output to the inspection operator in real time, i.e., data for a specific tubular is available to the inspection operator while that tubular is being tested. The diameter and ovality testing equipment preferably utilizes optical techniques which recognize that the spacing between the "passing portion" of two light beams each striking the tubular in a direction traverse to the tubular axis is directly related to the diameter of the tubular at that test location. Light sensors thus detect the width of the light beam transmitted past the tubular, and signals from the sensors are input to a computer and then output to a screen and/or conventional data storage device to provide real-time diameter measurements. Each tubular may be rotated as it is moved axially through the test equipment, and the ovality test is thus obtained as a function of successive diameter measurements. The equipment is preferably compatible with non-destructive testing equipment, so that a lot of tubulars may be tested for material defects and for diameter and ovality conformance at the same time.

A pair of optical shutters are used to standardize the test equipment and a digital micrometer provides the "standardized position" for the carriages corresponding to a specific oilfield tubular size. The shutters are preferably mounted on an upper and lower carriage each supporting a light beam generator and light beam sensor, and are each movable relative to the respective carriage from an operative standardization check position to an inoperative tubular-run position. The spacing between the carriages is controlled by a threadless lead screw, and a chain drive mechanism provides synchronization between right-side and left-side carriage supports.

According to the method of the present invention, the equipment is first calibrated with at least one specific test specimen. Once calibrated, the micrometer is zeroed to the specific test specimen size. The output from the micrometer is then used for standardization setting for each of the various oilfield tubular sizes to be tested. More specifically, the equipment is standardized at the nominal size of the tubular being tested by ensuring that the voltage output from the light sensors corresponds to the respective fully blocked, 50% block, and fully opened shutter position. At each shutter position, a movable dowel pin of a known diameter may be used to further add to or detract from the shutter setting to verify that the output from the light sensors corresponds to the standardized output. The carriages are then opened to a setting larger than the tubular to be tested while carriage movement is precisely measured by the micrometer. The pipe to be tested may then be inserted into the test equipment, and carriages partially closed until the micrometer output corresponds to the tubular size to be tested, at which point the output from a light sensor should closely approximate the standardized voltage setting. Equipment may thus be standardized by carefully monitoring carriage movement from a specific test specimen calibration position to a standardization check position which corresponds to the tubular to be tested, thereby effectively eliminating delays normally associated with standardizing equipment for each of the tubular sizes to be tested. Moreover, significant savings are realized by not requiring the manufacture and maintenance of numerous precisely-machined and closely-controlled test standards each corresponding to one of the more than 20 API tubular sizes.

The diameter and ovality test measurements of the present invention are highly reliable, and may be used to check the diameter of the tubular to within tolerances much more specific than those required by API specifications. Successive diameter test measurements may be used to determine that tubular ovality also is within selected limits. The equipment of the present invention provides high-speed oilfield tubular diameter and ovality testing to verify that tubulars conform with specifications, but may also be used to make precise diameter and ovality measurements to allow particular tubulars or a particular lot of tubulars to be selected for a specific downhole application as a function of the diameter and ovality measurements.

It is an object of the present invention to provide improved equipment for testing the diameter of tubulars such that tubulars may be checked while being inspected by non-destructive material testing equipment.

A related advantage of this invention is that the time required to recalibrate the testing equipment between different tubular diameter test jobs may be significantly reduced.

Yet another object of the present invention is to provide reliable equipment for measuring the diameter and ovality of tubulars, with the equipment providing an output of tubular diameter and ovality measurements in real time.

Still another object of the invention is providing an improved method for calibrating tubular diameter test equipment to a specific test specimen, and thereafter controlling the movement of a pair of carriages on which light generators and light sensors are mounted, such that the test equipment may be calibrated to a specific test specimen and carriage movement from that position thereafter monitored so that various sized tubulars may be checked without again recalibrating the test equipment. Light is preferably the medium used to monitor tubular diameter, although other mediums such as ultrasonic waves could be used.

It is a feature of the present invention that test equipment may be easily checked for reliability with a pair of optical shutters each mounted to a respective carriage, with each shutter being movable from an active standardization check position to an inactive tubular-run position.

It is another feature of the invention that a dowel of a selected diameter may be used to easily alter the amount of light which passes through the shutter at a specific setting, thereby providing a plurality of standardization check readings for each shutter setting.

Still another advantage of this invention is that a threadless lead screw may be utilized to control the spacing between the carriages, thereby providing reliable carriage positioning while mining the likelihood of equipment damage in the event that a tested tubular bumps against one of the carriages.

A related feature of the invention is the use of a chain drive mechanism to synchronize the left-side carriage support and the right-side carriage support.

Yet another advantage of the invention is that the radially opposing carriages move vertically relative to the machine frame. The light beams transmitted from the light generators to the light sensors are thus substantially horizontal, thereby reducing contamination buildup on the light generator and light sensor windows.

A significant advantage of the present invention is that various sized oilfield tubulars may be reliably checked to conform to diameter and ovality specifications while the tubulars are simultaneously being checked by non-destructive test equipment. The O.D. and ovality test equipment may thus be configured to cooperate with non-destructive test equipment so that a specific tubular may be simultaneously checked for diameter and ovality conformance and for material defects. Tubular O.D. may be checked at feed through rates in the range from 20 to 200 feet per minute.

Yet another advantage of this invention is that tubular ovality may be easily checked since tubulars may be rotated while they are moved axially through the test equipment. Alternatively, the tubular may be moved only axially through the test equipment and the radially opposing carriages rotated about the axially moving tubular.

These and further objects, features, and advantages of the present invention will become apparent from the following detailed description, wherein reference is made to the figures in the accompanying drawings.

DETAILED DESCRIPTION OF PREFERRED EMBODIMENTS

Figures 1, 2:
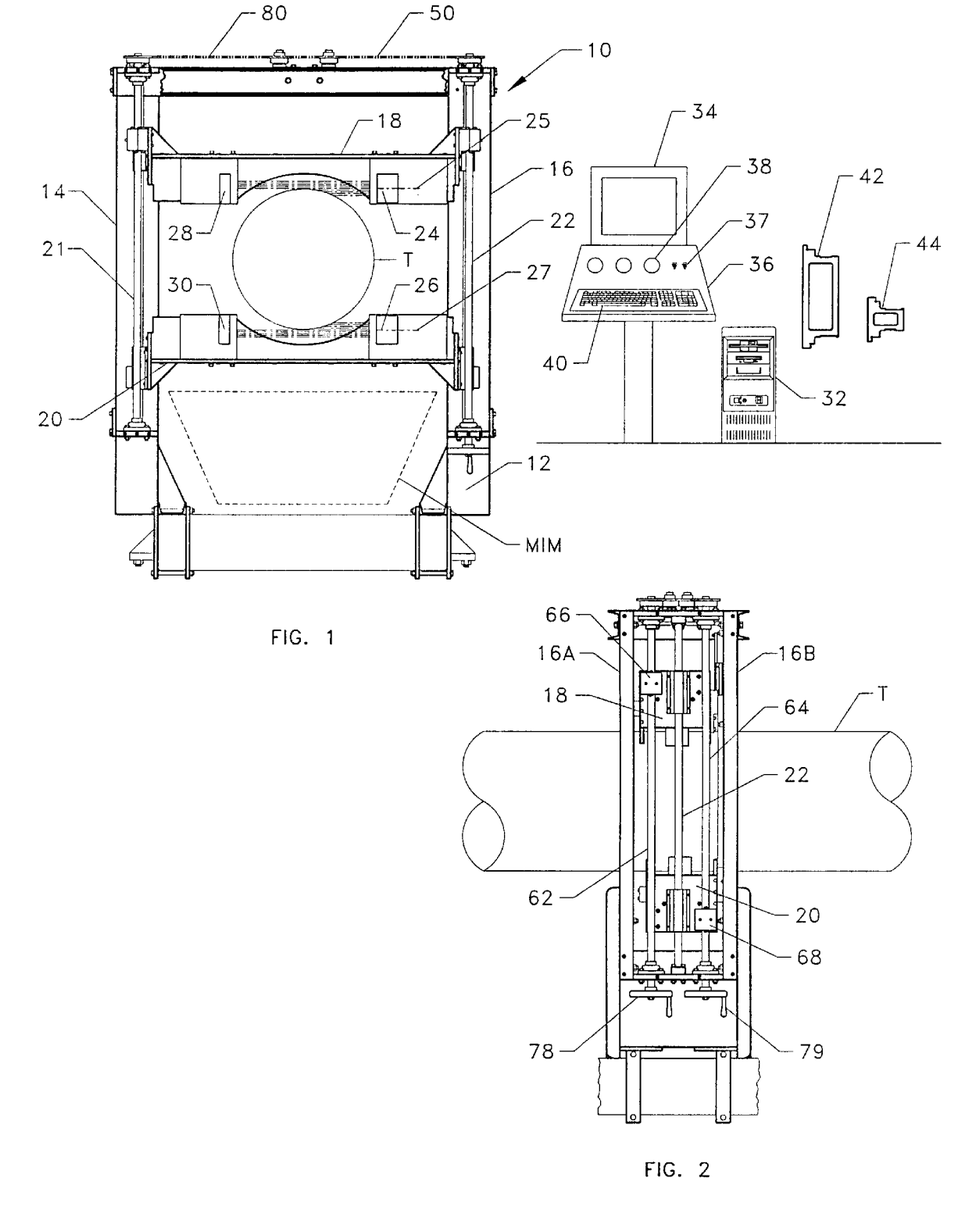
FIG. 1 is a simplified pictorial illustration of a oilfield tubular diameter and ovality test apparatus according to the present invention, illustrating in dashed lines a portion of ultrasonic test equipment positioned relative to the ovality and diameter test equipment.
FIG. 2 is a simplified side view of a portion of the diameter and ovality test equipment shown in FIG. 1.

FIG. 1 generally illustrates a test apparatus or test machine 10 for testing both the diameter and ovality of oilfield tubulars. The term "oilfield tubulars" as used herein should be understood to include any type of generally elongate tubular commonly used in oilfield operations, including casing, tubing, and drill pipe. Those skilled in the art will understand that oilfield tubulars are commonly available in various nominal sizes ranging from about 5 inches to about 24 inches in diameter. The test machine 10 of the present invention is specifically designed to test oilfield tubulars having various nominal diameters, and a representative tubular T having a nominal outside diameter of 20 inches is shown positioned within the test machine 10 in FIG. 1.

The test machine includes a stationary machine frame 12 for successively receiving tubulars T which move axially through the machine, as explained subsequently. Machine frame 12 includes two or more left-side vertical supports 14 and similar right-side vertical supports 16. Each of these supports may be standard structural members, such as I-beams or H-beams. As explained subsequently, the test machine 10 may be specifically constructed such that a series of oilfield tubulars each having the same nominal diameter may be successively tested by the machine 10 at the same time each tubular is tested for material defects by non-destructive testing equipment. The configuration of the non-destructive testing equipment may vary significantly, and it is a feature of the invention that the components of the test machine 10 as shown in FIG. 1 be substantially standardized. The position of the test machine components relative to the non-destructive testing equipment may thus be adjusted by varying the length of the test machine frame legs which, as shown in FIG. 1, extend downwardly from the left and right side supports 14 and 16. For illustration purposes, a portion of a non-destructive tubular material inspection machine MIM is shown in dashed lines in FIG. 1. The depicted MIM includes a holding tank for receiving a liquid couplant commonly used in the non-destructive testing operations. The machine frame legs for the test machine 10 allow a tubular T to pass through the test machine 10 so that the height of the tubular T may remain as shown in FIG. 1 while the MIM checks for material defects as each tubular is passed through the test machine. The test machine 10 may thus be immediately adjacent the MIM so that tubular diameter and ovality are tested immediately prior or immediately subsequent to the material defect inspection operation.

An upper and a lower radially opposing carriage 18 and 20 are each movably supported on the left-side supports and right-side supports 14 and 16. The vertical spacing between the carriages 18 and 20 may be adjusted in response to the nominal diameter of the tubular being checked for diameter and ovality as the tubular passes between the upper and lower carriages 18 and 20. A light-generating source 24 and 26 is mounted on each respective carriage 18 and 20. Each light-generating source generates a respective upper and lower relatively wide light beam directed to intersect radially opposing sides of the tubular T as shown in FIG. 1, such that the width of the light beams is reduced by engagement of each beam with the oilfield tubular. Various types of light-generating sources may be used in accordance with the present invention. A suitable light-generating source is the Model SP 4020 light source manufactured by Target Systems. As shown in FIG. 1, the width of each light beam (which is the height of each light beam from the embodiment as shown in FIG. 1) is reduced by engagement with the tubular T, and accordingly the light beams to the left of the tubular T as shown in FIG. 1 have a reduced width compared to the light beam to the right of tubular T. Upper and lower light sensors 28 and 30 are also each mounted on the carriages 18 and 20, and each light sensor serves to detect the width of each reduced width light beam and generates a test signal in response thereto. Suitable light sensors for detecting the width of light beams are the Model SP 4020 light receivers manufactured by Target Systems.

A simplified explanation of the function of the light sensors 28 and 30 for detecting the diameter of a specific oilfield tubular T will be briefly described. Assume that the spacing between the lowermost light beam from the upper light generator 24 and the uppermost light beam from the lower light generator 26 is set at 19.50 inches, that each light generator outputs a beam having a width of 0.50 inches, and that the tubular T has a nominal outside diameter of 20.00 inches. If the upper light sensor 28 and the lower light sensor 30 generate a signal indicating that each sensor is receiving a light width beam of 0.25 inches, the measured diameter of the tubular T will be in accord with its nominal diameter, since the 19.50 inch spacing and the combination of the two 0.25-inch readings will equal 20.00 inches. Assuming now that the same tubular sags slightly as it is passed through the test machine but that its nominal outside diameter remains at 20.00 inches, the upper light sensor 28 may generate a signal indicative of a 0.30-inch light beam width, while the lower light sensor 30 will then generate a signal indicative of a 0.20-inch light beam width. Again, sensors will indicate that the diameter of a tubular is still 20.00 inches. If the diameter of the tubular then changes and the upper light sensor 28 thereafter measures a beam width of 0.25 inches while the lower light sensor 30 measures a beam width of 0.20 inches, the combination of signals from the light sensor will indicate that the tubular T is oversized by 0.05 inches. If any change or shift in the distance between the upper carriage 18 and the lower carriage 20 occurs, the diameter reading is electronically compensated (corrected) by monitoring the electronic micrometer or linear scale 56, as discussed subsequently.

Those skilled in the art should appreciate that when the relative spacing between the upper and lower carriages 18 or 20 is known or presumed to be a specific value, the true width of each light beam need not be measured, and only the reduced width of the light beam that passes by the tubular may be sensed by the light sensors. Accordingly, the spacing between the upper and lower carriages 18 and 20 may alternatively be known or presumed, and this spacing may be expressed as a function of the spacing between the central axis 25 of the upper light beam generator 24 and the corresponding central axis 27 of the lower light beam generator 26. In this case, the light sensors need not measure the width of each light beam, and instead the upper light sensor 28 may detect the position of the lowermost light beam which passes by the tubular T relative to the central beam axis 25, while the lower light beam sensor 30 similarly measures the position of the uppermost light beam passing by the tubular T relative to the light beam axis 27. A response of the light sensors 28 and 30 to all other light beams is thus not necessary, although inherently those responses may assist in verifying that the upper light sensor 28 is in fact measuring the position of the lowermost light beam transmitted past the tubular T and similarly that the lower light sensor 30 is measuring the uppermost light beam passing by the tubular T.

In a preferred embodiment of the present invention, the sensors 28 and 30 measure the amount of light received by each sensor from the respective generator, which then translates to an effective width of the light beam. In other words, each sensor may be responsive to the amount of light that strikes the sensor, and the amount of light striking the sensor may then be used to effectively determine a light beam width, which in turn allows for the determination of the diameter of the tubular. Regardless of the technique used, those skilled in the art will appreciate that each light sensor is effectively measuring a characteristic of the upper and lower reduced width light beams and is outputting a signal representation of the position of the reduced width beams relative to each other, as monitored by the linear scale 56, thereby allowing for a determination of the tubular outer diameter. Also, those skilled in the art of detecting the diameter of oilfield tubulars will understand that the above explanation was for the purpose of assisting in understanding the function served by the test machine 10, and that the actual tubular diameter measurements capable of being tested by the test equipment of this invention are commonly much more precise than the tolerances given in this explanation.

As shown in FIG. 1, each of the upper and lower carriages 18 and 20 are vertically movable with respect to the frame 12 by moving along a left-side guide shaft 21 and a right-side guide shaft 22. As explained subsequently, simultaneous vertical movement of the left and right side of either carriage 18 or 20 is controlled by synchronization mechanisms 50, described in detail below.

Still referring to FIG. 1, the test machine 10 further includes a data processing and system operation computer 32 and preferably a display screen 34, which optionally may be mounted on an operator control panel 36. Control panel 36 includes a plurality of conventional switches 37 and gauges 38, and preferably a keyboard 40 for operator communication with the computer 32. Also shown in FIG. 1 are calibration standards 42 and 44, which are plates precisely machined to a specific dimension that may be used in the calibration process described subsequently. Suitable standards 42 and 44 may have precisely machined top hole and bottom hole edges spaced vertically at, for example, 5 inches and 20 inches, respectively. Control panel 36, computer 32, the light generators 24, 26, and the light sensors 28 and 30 may be electrically interconnected by conventional electrically conductive wires (not shown), although alternatively various types of telemetry systems may be used to provide communication between these components.

With reference to FIG. 2, a portion of the test machine 10 is shown with a tubular T passing by a respective front right-side support 16A and then a rear right-side support 16B. The lower leg members of the frame 12 and the synchronization mechanisms 50 are deleted from the FIG. 2 view for clarity. A primary purpose of FIG. 2 is to show a construction for the center guide shaft 22 and both an upper carriage support shaft 62 and a lower carriage support shaft 64. Both the upper carriage and lower carriage thus move vertically along the center guide shaft 22 and a respective one of the upper and lower carriage support shafts 62, 64. An upper actuator 66 and a lower actuator 68 may be mounted on the respectively upper and lower carriages. An operator may thus turn the hand wheel 78 to rotate the upper carriage support shaft 62, which then cooperates with the actuator drive 66 to move the upper carriage 18 vertically along the shaft 62 and the center guide shaft 22. The hand wheel 79 may be used to rotate the shaft 64 for similarly raising and lowering the lower carriage 20. Suitable upper and lower actuators 66 and 68 are the Model ROH'LIX blocks manufactured by Zero-Max. The ROH'LIX blocks may move the carriages vertically along a stainless steel guide shaft of the type marketed by Thompson Industries. It should be understood that similar upper and lower carriage shafts and the left side center support shaft 21 shown in FIG. 1 are associated with the left side support 14.

Figure 3:
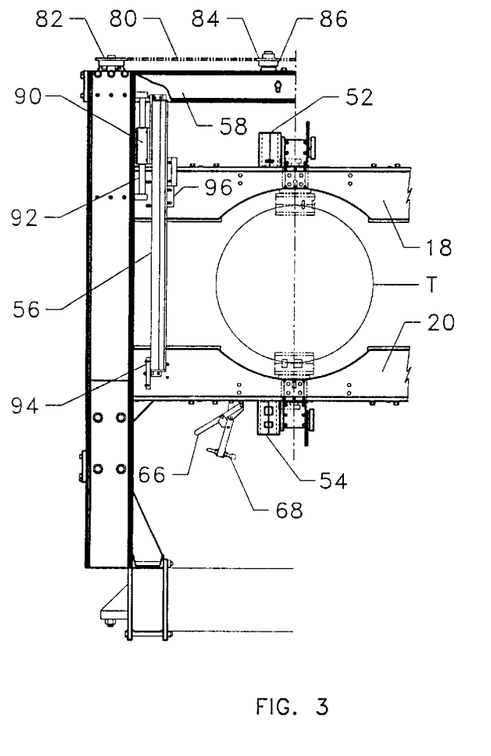
FIG. 3 is a detailed front view of a portion of the test equipment generally shown in FIGS. 1 and 2, and specifically illustrating a digital micrometer for measuring the carriage position and the upper and lower optical shutters pivotally mounted to the carriages.

FIG. 3 illustrates in greater detail a portion of the test machine shown in FIGS. 1 and 2, and specifically illustrates a digital micrometer or linear scale 56 for measuring the position of the upper and lower carriages 18 and 20 relative to each other, and also illustrates upper and lower optical shutters 52 and 54 pivotally mounted to the carriages 18 and 20. The micrometer scale 56 is fixed to the lower carriage 20 by bracket 94. The upper end of the scale 56 is supported through linear bearings 90 by vertical shaft 92. The micrometer 56 includes a micrometer head 96 which is fixed to the upper carriage 18. Thus as either the upper or lower carriage is moved, the micrometer 56 measures the relative vertical spacing between the upper and lower carriages 18, 20 and outputs an electric signal indicative of that spacing. While various types of linear scales or micrometers may be used for this purpose, a suitable micrometer is the Model AT 102 linear scale manufactured by Mitutoyo. Series 174 micrometers also available from Mitutoyo may be used to output a signal indicative of the left side and the right side of both the upper and lower carriages.

Both the upper shutter assembly 52 and the lower shutter assembly 54 are shown in solids lines in FIG. 3 in the inactive position, wherein the shutters do not interfere with axial movement of the tubular T between the upper and lower carriages 18, 20. Each shutter assembly 52, 54 is pivotally mounted to a respective carriage, and may be moved to the active standardization position as shown in dashed lines in FIG. 3. As explained subsequently, the tubular T is not positioned between the carriages when the shutter assemblies 52 and 54 are used to standardize the test assembly 10. A conventional toggle mechanism 66 may be mounted to each carriage for retaining the respective shutter assembly in the active standardization position. Each toggle mechanism may include an adjustable spindle 68 for adjustably exerting a selected retaining force on the respective shutter assembly when the toggle mechanism 66 is activated.

Figure 5:
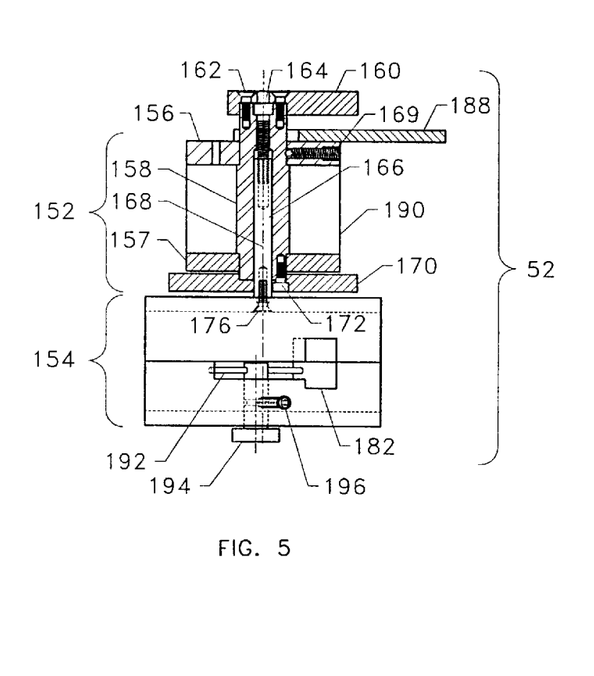
FIG. 5 is a detailed cross-sectional view of one of the shutters shown in FIG. 3.
Figure 6:
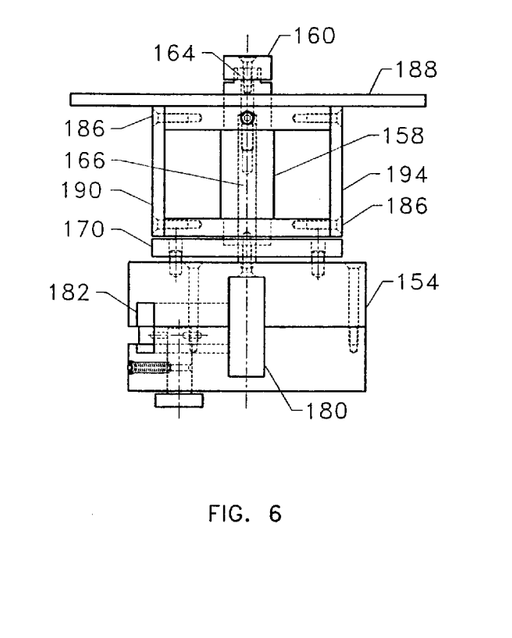
FIG. 6 is an end view of the shutter shown in FIG. 5.

With reference now to FIGS. 5 and 6, each of the shutter assemblies 52 and 54 may be structurally identical. The shutter assembly 52 comprises a shutter mount 152 and a shutter blank 154. Shutter mount 152 includes a shutter top plate 156, shutter side plates 190, and a shutter bottom plate 157, which together form a box-like mount for receiving shutter shaft 158. Conventional threaded bolts 186 interconnect the side plates 190 and the top and bottom plates 156 and 157, as better shown in FIG. 6. The shutter shaft 158 may be rotated by handle 160, which is secured to the shaft 158 by a pair of conventional screws 162. A threaded alignment pin 164 interconnects the shaft 158 to pin 166, thereby allowing axial movement of the pin along the axis 168. A spring plunger 169 may be positioned within the top plate 156 for retaining the shaft 158 in a selected position until the operator rotates the handle 160. An alignment shutter plate 170 is secured to the shutter shaft 158 by a conventional threaded member 172, and serves to precisely align the shutter when in use. Stop plate 188 is provided for limiting rotational movement of the shutter 52 relative to the carriage when the shutter assembly is moved to the active standardization check position.

The pin 166 extends downwardly from the mount 152 as shown in FIG. 5, and the shutter blank 154 is secured to the end of the pin by a conventional threaded member 176. The shutter blank 154 includes a plurality of selectively sized apertures 180 and 182 therein for passing a select width beam from the light source to the sensors, as described subsequently.

Figure 7:
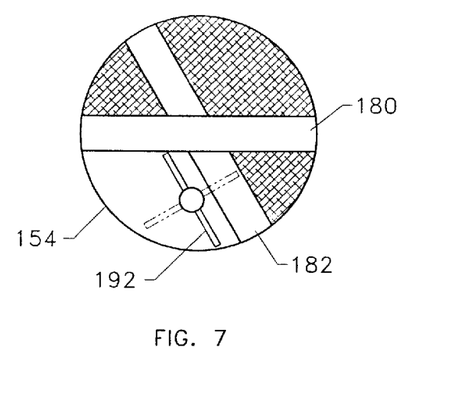
FIG. 7 is a cross-sectional view of the shutter block shown in FIGS. 5 and 6.

FIG. 7 depicts in cross-section the generally cylindrical shutter blank 154. The two different sized through apertures 180 and 182 are depicted, along with a dowel pin 192 for selectively positioning in or out of the aperture 182. The dowel pin 192 is thus shown in FIG. 7 in solid lines out of the aperture 182, and in dashed lines within the aperture 182. FIG. 5 depicts the dowel pin 192 rotatably movable with respect to the body of the shutter blank 154 by rotating rod 194 which extends downward from the pin 192. Position detent 196 is provided for selectively fixing the position of the dowel pin 192 in the active position within slot 182 or in the inactive position out of slot 182.

It should thus now be understood that when the shutter assemblies 52 and 54 are pivoted to the active standardization position as shown in dashed lines in FIG. 3, each shutter blank 154 may be precisely positioned relative to a respective carriage. When in one position, each shutter blank will entirely block light from the generator to the respective sensor. When in another position, the shutter is completely open and full width light beam passes through a respective one of the selectively sized apertures 180 and 182 and to the respective sensor. When in a third position, a restricted width light beam e.g., a 50% width light beam, passes through the aperture in the shutter blank to strike the respect light sensor. The amount of light received by the sensor when in this third position may be thereafter varied, as described subsequently, by selectively positioning either or both of the dowel pins 192 associated with the shutters 52, 54 within the path of the respective aperture 182, thereby providing a modified light intensity beam to the respective sensor.

Figure 4:
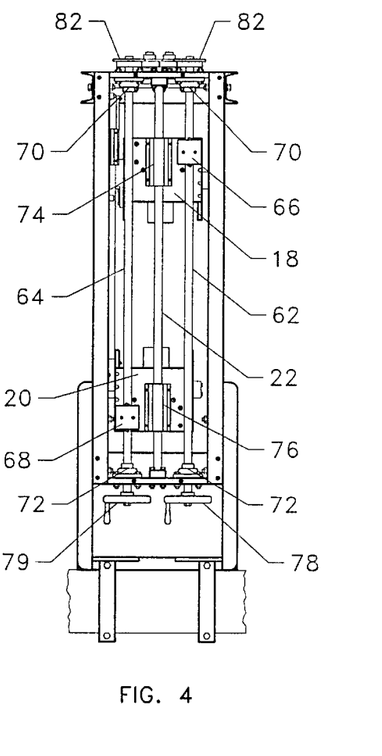
FIG. 4 is a detailed side view of a portion of the test equipment generally shown in FIGS. 1 and 2.

FIG. 4 depicts in greater detail the various components linearly movable along the shafts 62, 22 and 64 discussed earlier. As previously noted, rotation of shaft 62 cooperates with actuator 66 to raise and lower the upper carriage 18, and rotation of shaft 64 causes actuator 68 to similarly raise and lower the lower carriage 20. An upper flange bearing 70 and a lower flange bearing 72 are provided for guiding rotational movement of each of the shafts 62 and 64. An upper linear bearing 74 is shown for guiding movement of the upper carriage 18, and a similar linear bearing 76 is shown for guiding the lower carriage 20.

Referring to FIGS. 1, 3, and 5, test machine 10 includes two synchronization mechanisms 50, one for each carriage 18, 20. The chain 80 is movable between end sprockets 82. Idler sprocket 84 and a drive tightener mechanism 86 are provided for maintaining a proper tension in the chain 80. The synchronization mechanisms 50 serve to ensure that the left side and right side of upper carriage 18 or a lower carriage 20 move vertically in synchronization in response to rotation of their respective shaft 62 or 64. Thus only one shaft 62 may be rotated for cooperation with the actuator 66 to raise one side of the upper carriage 18, and vertical movement of that side of the carriage 18 is translated through the synchronization mechanism 50 to cause corresponding movement of the other side of the upper carriage 18. Thus the synchronization mechanisms 50 enable each of the upper and lower carriages 18 and 20 remain horizontal as the carriages are moved to receive different nominal sized oilfield tubulars, as described subsequently.

The method of the present invention will now be described, first with respect to the technique of calibrating the test equipment, second with respect to the technique for standardizing the test equipment for a particular nominal diameter oilfield tubular, and third with respect to passing oilfield tubulars through the test apparatus to inspect the diameter and ovality of the tubulars. As used herein, the term "calibrate" means to verify the output of the test apparatus to a specific test standard such as standards 42 and 44 described earlier. A "standardization check" of the equipment for a specific nominal diameter oilfield tubular involves a process of utilizing the optical shutters and the scale or micrometer 56 to check the output of the test apparatus without utilizing test standards 42 and 44. A particular feature of the invention is that the test apparatus need not be calibrated for each nominal sized oilfield tubular being tested. Instead the test equipment may be calibrated and then reliably standardized for different sized oilfield tubulars while maintaining the same calibration, thereby resulting in significant savings by reducing the downtime between conducting diameter and ovality tests on different nominal diameter oilfield tubulars. Accordingly, the test equipment 10 of the present invention may be calibrated at regular intervals of several months, and may thereafter be quickly standardized several times a day or as often as necessary to check the diameter and ovality of different size oilfield tubulars.

In order to calibrate the test apparatus 10, a selected standard 42 of a specific dimension may be used. The position of both the upper and the lower carriages may be adjusted to substantially correspond to the dimension of the test specimen 42. The spacing between the upper and lower carriages 18, 20 will be read by the linear scale 56 and output as a signal to the computer 32. With the upper and lower carriages 18, 20 properly positioned at a preselected distance, the test specimen 42 may then be positioned between the upper and lower carriages. The upper and lower wide light beams will then each strike the perimeter of the test specimen and reduced width light beams will be read by the light sensors 28 and 30. Each light sensor will then output a signal indicative of the reduced width light beam read by that sensor. The combination of these signals from the light sensors 28 and 30, when correlated with the output from the linear micrometer 56, should then read the specific dimension of the test specimen 42. If the output differs from the intended output for that test specimen 42, the digital micrometer and light sensors may be checked and adjusted as necessary. Assuming the test standard 42 conforms to its specified dimension, the test equipment may thus be adjusted utilizing conventional techniques, such as setting or fixing stops on the shafts 62, 22 or 64 to fix the position of a carriage at this calibrated setting, until the output from the light sensors and the linear transducer results in an output which corresponds to this specific test standard 42. If desired, this calibration function may be rechecked with another test standard 44 utilizing the same procedure described above.

Further calibration is obtained by determining specific voltages for various percentages of beam width variations. With both shutters 52, 54 in the full open position, 100% of the light from each beam is passed through the appropriate aperture in the respective shutter and to the light sensors 29, 30. With the selector switch 46 (see FIG. 8) in the GAUGE VOLTAGE position, a reference voltage ($V_{min}$) is produced and displayed on the digital volt meter (DVM) 48. This voltage should be noted as it may be used in later standardization procedures. When the light beams are fully blocked by the shutters 52, 54 being in the full closed position, 0% of the light reaches the light sensors and this results in another reference voltage being produced and displayed on the DVM 48. This 0% light voltage is designated $V_{max}$ and should also be noted for use in subsequent standardization procedures. When 50% of the combined beams are blocked (either by one shutter filly open and the other fully closed, or by both shutters positioned in the 50% light beam position and a dowel pin 92 in the active position within one of the shutters), another reference voltage is produced and displayed on the DVM 48. This displayed voltage should be ½ of the difference between the previously determined $V_{max}$ and $V_{min}$ or mathematically $\frac{1}{2}(V_{max}-V_{min})$ and will be designated $V_{nom}$. This $V_{nom}$ should also be noted for later use. One other reference voltage is needed that represents 25% of the total beam being blocked. This can be determined by calculating 25% of the difference between $V_{max}$ and $V_{min}$ or mathematically $\frac{1}{4}(V_{max}-V_{min})$. This reference voltage is designated $V_{25}$. It should also be noted as it may be used to set the height of the lower carriage in subsequent standardization.

Once equipment has been calibrated, numerous lots of oilfield tubulars each having a different nominal diameter size may then be reliably checked for diameter and ovality without recalibrating the test equipment. To standardize the test equipment for a specific nominal diameter oilfield tubular, the upper and lower carriages may be moved until the output from the micrometer 56 corresponds to the nominal diameter tubular to be checked, and the upper and lower shutter assemblies 52, 54 then each pivoted to their vertical position as shown in FIG. 3. The operator may then activate the light generators 24 and 26. Each shutter assembly may have multiple shutter positions, although the shutter assemblies described herein only has three shutter positions. At each shutter position, the predetermined reference voltage should be output by the light detectors 28, 30 proportional to the total amount of the beam blocked by the selected shutter setting and, with the selector switch 46 set to the GAUGE VOLTAGE position, displayed on the DVM 48. The voltages produced and displayed on the DVM should correspond to the previously determined reference voltages noted in the calibration procedure. With 50% of the total light beam blocked by any combination of shutters and dowel pins and the selector switch in the GAUGE VOLTAGE position, the DVM should display the previously determined reference voltage $V_{nom}$. At this point, the operator, by means of a keyboard 40, may instruct the computer 32 to generate an offset voltage $V_{offset}$ equal to $V_{nom}$. Placing the selector switch 46 in the DIFFERENTIAL OUT position will then result in the difference of the 2 voltages $V_{nom}$ and $V_{offset}$ being displayed on the DVM 48. If the equipment is operating properly, this voltage should be 0 volts. This is now the reference from which further testing is based.

In order to further easily standardize the equipment, both or neither of the dowel pins 192 may be inserted into the respective aperture 182 in the shutters 52, 54. As previously noted, one active dowel pin 172 and one inactive dowel pin may correspond to the $V_{nom}$ reading. If the second dowel pin is then inserted or if the one active dowel pin is rotated to the inactive position, a change in the differential voltage from the differential amplifier will result. Due to the fact that the dowel pin dimension is known and since the change in voltage can be determined as a result of the effective change in the total beam width due to the inclusion or exclusion of dowel pins, a scaling factor can be calculated by the computer 32 for use in graphically displaying the voltage on screen 34 and applying appropriate units to the display, such as volts per thousandth or thousandths per display increment. Assuming the output from the light sensors reads in accordance with the standardized output, the equipment may be assumed to be properly standardized. If the output from light sensors does not correspond to the predetermined $V_{nom}$, the linear micrometer, the shutters, and the light sensors may be checked for accuracy. Preliminary test results suggest that this standardization procedure is highly reliable and that numerous batches of oilfield tubulars may be reliably checked by standardizing the test equipment in the manner suggested above without recalibrating the test equipment. Assuming the test equipment is properly standardized, the shutter assemblies may then be moved to the inactive test run position in preparation for selectively receiving a lot of oilfield tubulars through the test apparatus.

As previously indicated, each tubular is passed axially through the test apparatus at a high rate of speed commensurate with the speed at which non-destructive testing equipment tests oilfield tubulars. Prior to receiving the first tubular, the upper and lower carriages may be extended to their maximum vertical separation, and the first tubular then inserted into the test apparatus with the selector switch 46 placed in the GAUGE VOLTAGE position. The upper carriage may then be lowered until 50% of the upper beam is blocked as indicated by a voltage reading of $V_{25}$, on the DVM 48. The lower carriage then raised until its vertical position with respect to the upper carriage corresponds to the nominal diameter of the tubular to be inspected. In other words, if the outside diameter of the tubular to be tested were 14.375 inches, the upper carriage may be lowered until its light sensor is 50% blocked, then the lower carriage raised to a position with respect to the upper carriage until the linear transducer 56 indicated that the separation of the upper and lower carriages was at 14.375 inches. When the lower carriage was at this position, the differential output displayed on the DVM 48 should also be approximately $V_{nom}$, since the width of each light beam should theoretically be reduced by 50%. The differential voltage displayed may not exactly read $V_{nom}$, however, because the tubular to be checked may not conform exactly to its intended nominal diameter. Regardless of the reading, however, the output from the two light sensors 28, 30 may be used in conjunction with the output from the linear transducer, as explained above, to check the outer diameter of the tubular. Those skilled in the art will appreciate that the above operation may be altered so that the lower carriage is first raised then the upper carriage lowered to achieve the same result.

The tubular is then passed through the test apparatus in a rapid fashion. Readings from the light sensors are transmitted to the computer in real-time, so that diameter measurements are available to the operator while the tubular is being passed through the test machine. In a preferred embodiment of the invention, the tubular is rotated slightly as it is moved axially through the test apparatus. The output from the light sensors is read at regular intervals corresponds to a known or presumed axial movement of the tubular with respect to the test machine and a known or presumed rotation of the tubular during that axial movement. Since the tubular is rotated, a series of tubular diameter readings may be used to generate an ovality measurement. Ovality determinations may be obtained by comparing a series of diameter measurements obtained as the tubular rotates one full revolution through the test machine. In some instances, the specific diameter of the tubular will be within acceptable ranges, but the ovality of the tubular as determined by the change in diameter readings will be outside of the ovality limits for that oilfield tubular.

After one batch or lot of tubulars has been inspected for diameter and ovality, the upper and lower carriages may be moved as discussed above to correspond to another tubular diameter, and the equipment again standardized using the optical shutters as described above. Each standardization operation may start with ensuring that the readings correspond to the calibration setting when the carriages are moved against the stops. Once standardized, the upper carriage may be lowered until, with the selector switch 46 in the GAUGE VOLTAGE position and the other light beam not blocked, the DVM 48 indicates the predetermined $V_{25}$ voltage. The lower carriage may then be raised according to the procedure discussed above until the linear transducer indicates the desired spacing between the upper and lower carriages. Another lot of tubulars having a different nominal diameter may then be tested. Depending on the number of tubulars tested, the test machine may be standardized before or after each lot of tubulars is checked, or perhaps once or twice during the operation of testing one lot of tubulars. Each time different size tubulars are to be tested, the test machine is preferably standardized, but need not be recalibrated.

Figure 8:
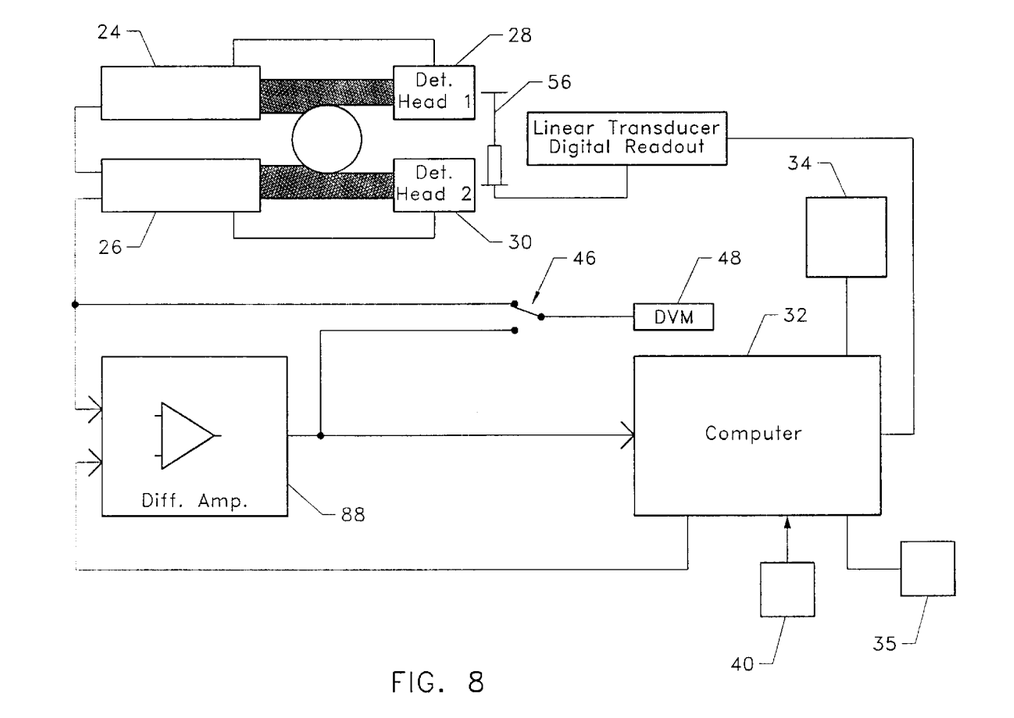
FIG. 8 is a schematic block diagram of the test system according to the present invention.

Referring to FIG. 8, an operator may utilize keyboard 40 to communicate with the computer 32, which then directs a signal to the differential amplifier 88. The DVM 48 essentially serves to display the combined gauge voltage outputs from the light sensors or, by means of the selector switch 46, the amplified difference of the combined gauge voltage output and the offset voltage generated by the computer 32. This voltage, when the equipment is properly standardized and 50% of the total beam is blocked, should be zero. A tubular passing though the light beam will produce a higher or lower voltage to be displayed depending on whether it has a dimension greater or less than the specified nominal diameter. The output from the linear scale or micrometer 56 may be input to the computer 32, and the output graphically displayed to the operator on monitor 34. The data on each test run may be stored in the computer 32, and if desired may be output on hard copy by a printer 35.

The technique of the present invention may be used to measure the diameter of oilfield tubular to a precise diameter, at a tolerance of 0.004 inches is certainly realistic. As previously indicated, both diameter and ovality measurements may be taken since the tubular is rotated as it is passed axially through the test apparatus. In an alternative embodiment, the tubular may be passed axially through the test apparatus in a non-rotational manner, and the carriages 18, 20 then rotated so that both diameter and ovality measurements can be obtained.

Various modifications of the invention will be suggested from the above description. The threadless lead screw and actuator as discussed above are preferred components which allow a vertical position of the upper and lower carriages to be easily set in response to a signal from the computer. These type of lead screws are preferred to a conventional mechanical lead screw with a spiraling thread, since this threadless type of lead screw is both highly reliable and is not highly susceptible to damage in the event that the tubular inadvertently bumps against one of the carriages.

A preferred embodiment of the invention as disclosed herein utilizes an upper carriage and the lower carriage on which both the light generators and light sensors are mounted. In an alternate embodiment, the radially opposing carriages may be a left-side carriage and a right-side carriage, or may be positioned at some specified angle, e.g., 45° from horizontal. The embodiment as shown in the figures is preferred since the carriage supports and the central shafts may then be vertical, and since the lenses which cover both the light generator and light sensors may then each lie in a substantially vertical plane and will not be susceptible to being covered by dust or grit.

A preferred system as disclosed herein utilizes light beams to intersect opposing sides of the tubular to check the diameter and ovality of the tubular. This type of optical system is both highly reliable and is available at a reasonable cost. As an alternative, beams other than light beams may be directed to intersect the outer diameter of a tubular, and sensors then used to measure the reduced width beams which pass transversely by the tubular. Ultrasonic waves could thus be used instead of light beams for determining the diameter of the tubular. Also, equipment in the present invention is specifically intended for measuring the diameter of oilfield tubulars since these tubulars must frequently be checked in various nominal diameter sizes, and since the equipment of the present invention is specifically adapted for reducing the downtime between checking different size tubulars. The equipment could be used, however, to check the diameter and ovality of either solid rods or other elongate members having a non-circular outer configuration which are passed through the test apparatus.

The foregoing disclosure and description of the invention are illustrative and explanatory thereof It will be appreciated by those skilled in the art that various other changes in the size, shape and materials, as well as in the details of the illustrated construction or combinations of features of the test apparatus or the method of calibrating, standardizing the test apparatus, and running elongate goods through the test apparatus to conduct transverse size measurements may be made without departing from the spirit of the invention, which is defined by the claims.

What is claimed is:

1. Apparatus for testing the diameter of tubulars having various nominal diameters, comprising:

a machine frame for successively receiving axially moveable tubulars;

first and second radially opposing carriages each moveable relative to the machine frame such that an axially moveable tubular passes between the radially opposing carriages;

first and second light generating sources mounted on the respective first and second carriages for transmitting respective first and second wide light beams directed to intersect radially opposing sides of the tubular spaced between the carriages, such that the width of the first and second light beams is reduced by engagement with the tubular and first and second reduced width light beams pass by the tubular;

first and second light sensors each mounted on the carriages for detecting the respective first and second reduced width light beams while the tubular moves axially past the first and second light beams and generating test signals in response thereto;

first and second optical shutters mounted on the carriages and each moveable with respect to the respective light beam from an active standardization check position to an inactive tubular-test position, each optical shutter having an opening therein for transmitting a preselected reduced width light beam past the shutter; and a computer for receiving the test signals from the first and second light sensors and generating a tubular diameter test measurement in response thereto.

2. The apparatus as defined in claim 1, further comprising:

a micrometer for measuring a radial spacing between the first and second carriages and generating a carriage spacing signal in response thereto; and the computer generates the tubular diameter test measurement in response to the test signals and the carriage spacing signal.

3. The apparatus as defined in claim 1, further comprising:

the first and second optical shutters each have a plurality of selectively sized shutter openings therein, such that each shutter when in an active standardization check position may be manipulated so that a selected one of the selectively sized openings passes a preselected reduced width light beam.

4. The apparatus as defined in claim 1, wherein each of the first and second optical shutters is pivotally mounted to a respective first and second carriage for movement between the active standardization check position and the inactive position.

5. The apparatus as defined in claim 1, wherein the first and second shutters further comprise a dowel pin of a preselected outer diameter for positioning within the shutter opening to further restrict the reduced width light beam.

6. The apparatus as defined in claim 1, further comprising:

the axially movable tubulars rotate while moving past axially between the first and second radial opposing carriages; and the computer determines tubular ovality by comparing a series of tubular diameter test measurements.

7. The apparatus as defined in claim 1, further comprising:

a threadless lead screw activator for controlling the radial spacing between the first and second carriages.

8. The apparatus as defined in claim 1, further comprising:

first and second carriage supports each for supporting a respective first and second end of the first and second carriages; and a synchronization mechanism for synchronizing movement of the first and second end of each of the first and second carriages.

9. The apparatus as defined in claim 8, wherein the first and second carriage supports are respective left-side and right-side carriage supports for raising and lowering the first and second carriages with respect to the machine frame; and the synchronization mechanism is a chain drive mechanism for simultaneously raising or lowering a left-side and a right side of a carriage.

10. A method of testing the diameter of various nominal diameter tubulars, comprising:

successively moving a plurality of tubulars axially relative to a machine frame and between first and second radially opposing carriages each moveable relative to the machine base;

mounting first and second light generating sources, first and second light sensors, and first and second optical shutters on the respective first and second carriages;

directing first and second light beams from the respective first and second light-generating sources against radially opposing sides of a tubular spaced between the first and second carriages such that the width of the first and second light beams is reduced by engagement with the tubular and reduced width light beams pass by the tubular;

while both rotating the tubular and moving the tubular axially relative to the first and second carriages, sensing the first and second reduced width light beams with the respective first and second light sensors and generating a test signal in response thereto;

receiving test signals from the light sensors and generating tubular diameter test measurement in response thereto; and determining tubular ovality as a function of successive tubular diameter measurements.

11. The method as defined in claim 10, further comprising:

rotating the first and second carriages around the axially moving tubular and relative to the machine frame while sensing the first and second reduced light width beams.

12. The method as defined in claim 10, further comprising:

continuously monitoring the spacing between the first and second carriages; and generating tubular diameter test measurements in response to the test signals and the monitored spacing.

13. The method as defined in claim 10, further comprising:

supporting opposing ends of each carriage; and synchronizing movement of opposing ends of each carriage.

14. The method as defined in claim 10, further comprising:

positioning each of the first and second shutters in an active standardization check position such that a preselected reduced width light beam passes by each shutter; and moving the first and second shutters from the active standardization check position to an inactive tubular-test position.

15. The method as defined in claim 14, further comprising:

positioning a specific test specimen between the first and second carriages to calibrate the spacing between the first and second carriages to a calibration position while the first and second shutters are in the active standardization check position.

16. The method as defined in claim 15, further comprising:

controlling movement of the upper and lower carriages from the calibration position to the standardization check position representative of a specific nominal diameter tubular.

17. The method as defined in claim 14, further comprising:

providing each first and second shutter with a plurality of shutter openings, and manipulating each shutter while in the active standardization check position such that a selected shutter opening transmits a pre-selected light width past the shutter.

18. The method as defined in claim 14, further comprising:

each first and second shutter is pivotally mounted relative to the respective carriage; and pivotally moving each shutter between the active standardization check position and the inactive tubular-test position.

19. The method as defined in claim 14, further comprising:

selectively positioning a pre-determined dowel in a shutter opening to further restrict light to a respective one of the first and second sensors.

20. Apparatus for testing the diameter of tubulars having various nominal diameters, comprising:

a machine frame for successively receiving axially moveable tubulars;

first and second radially opposing carriages each moveable relative to the machine frame such that an axially moveable tubular passes between the radially opposing carriages;

first and second light generating sources mounted on the respective first and second carriages for transmitting respective first and second wide light beams directed to intersect radially opposing sides of the tubular spaced between the carriages, such that the width of the first and second light beams is reduced by engagement with the tubular and first and second reduced width light beams pass by the tubular;

first and second light sensors each mounted on the carriages for detecting the respective first and second reduced width light beams while the tubular moves axially past the first and second light beams and generating test signals in response thereto;

a left-side micrometer and a right-side micrometer for measuring a left-side radial spacing and a right-side radial spacing, respectively, between the first and second carriages and generating a left-side carriage spacing signal and a right-side carriage spacing signal in response thereto; and a computer for receiving the test signals from the first and second light sensors and the spacing signals from the left-side micrometer and the right-side micrometer, and generating a tubular diameter test measurement in response to the test signals and the left-side and right-side carriage spacing signals.

21. The apparatus as defined in claim 20, further comprising:

a threadless lead screw activator for controlling the radial left-side and right-side spacing between the first and second carriages.

22. The apparatus as defined in claim 20, further comprising:

first and second carriage supports each for supporting a respective first and second end of the first and second carriages; and a synchronization mechanism for synchronizing movement of the first and second end of each of the first and second carriages.

* * * * *

UNITED STATES PATENT AND TRADEMARK OFFICE
CERTIFICATE OF CORRECTION

PATENT NO. : 5,867,275
DATED : February 2, 1999
INVENTOR(S) : William W. Curtis et al.

It is certified that error appears in the above-indentified patent and that said Letters Patent is hereby corrected as shown below:

In column 18, line 15, remove "radial" before "left-side and right-side", and insert "radial" after --left-side and right-side--.

Signed and Sealed this

Eighteenth Day of May, 1999

*Attest:*

Q. TODD DICKINSON

*Attesting Officer*   *Acting Commissioner of Patents and Trademarks*